United States Patent [19]

Holub et al.

[11] Patent Number: 4,468,506

[45] Date of Patent: Aug. 28, 1984

[54] POLYETHERIMIDE BLENDS

[75] Inventors: Fred Holub, Schenectady, N.Y.;
Daniel E. Floryan, Pittsfield, Mass.;
Dwain M. White, Schenectady, N.Y.

[73] Assignee: General Electric Company, Pittsfield, Mass.

[21] Appl. No.: 563,549

[22] Filed: Dec. 21, 1983

Related U.S. Application Data

[63] Continuation of Ser. No. 364,904, Apr. 2, 1982, abandoned.

[51] Int. Cl.³ ............................................ C08L 79/08
[52] U.S. Cl. .................................. 525/432; 525/436; 525/928
[58] Field of Search ....................... 525/432, 436, 928

[56] References Cited

U.S. PATENT DOCUMENTS 4,255,471 3/1981 Boldenbuch ...................... 525/928
4,293,670 10/1981 Robeson ............................ 525/928
4,360,633 11/1982 Bolon ................................ 525/928

*Primary Examiner*—Paul Lieberman
*Attorney, Agent, or Firm*—Bernard, Rothwell & Brown

[57] ABSTRACT

Disclosed are blends of two or more polyetherimides. Such blends generally exhibit a high glass transition temperature, e.g., from about 125° to about 210° C., which makes the blends particularly suitable for automotive and appliance applications.

9 Claims, No Drawings

POLYETHERIMIDE BLENDS

This is a continuation of application Ser. No. 364,904 filed Apr. 2, 1982 now abandoned.

This invention relates to a class of polyetherimide blends. The blends exhibit a high glass transition temperature, e.g., from about 125° to 210° C., which makes the blends particularly suitable for automotive and appliance applications. Preferred blends comprise an aliphatic polyetherimide and an aromatic polyetherimide, i.e., blends of a polyetherimide formed from an aliphatic diamine and a polyetherimide formed from an aromatic diamine.

The blends of the invention include a polyetherimide of the formula:

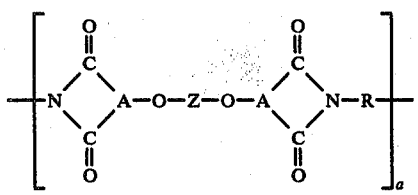

where a represents a whole number in excess of 1, e.g., 10 to 10,000 or more, the group —O—A is selected from:

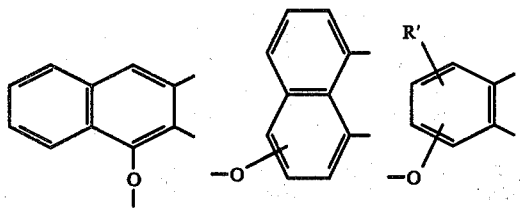

R' being hydrogen, lower alkyl or lower alkoxy, preferably a polyetherimide includes the latter —O—A< group where R' is hydrogen such that the polyetherimide is of the formula:

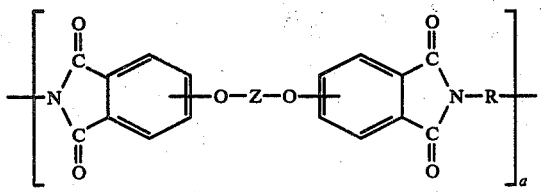

and the divalent bonds of the —O—Z—O— radical are in the 3,3'; 3,4'; 4,3' or the 4,4' position; Z is a member of the class consisting of (1)

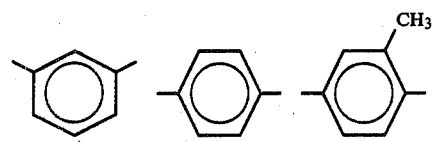

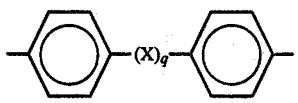

and (2) divalent organic radicals of the general formula:

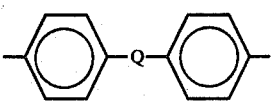

where X is a member selected from the class consisting of divalent radicals of the formulas,

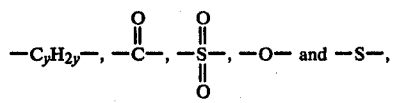

where q is 0 or 1, y is a whole number from 1 to 5, and R is a divalent organic radical selected from the class consisting of (1) aromatic hydrocarbon radicals having from 6-20 carbon atoms and halogenated derivatives thereof, (2) alkylene radicals and cycloalkylene radicals having from 2-20 carbon atoms, $C_{(2-8)}$ alkylene terminated polydiorganosiloxane, and (3) divalent radicals included by the formula

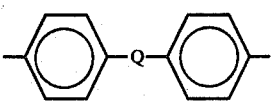

where Q is a member selected from the class consisting of

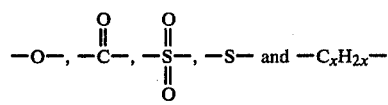

where x is a whole number from 1 to 5 inclusive. Particularly preferred polyetherimides for the purposes of the present invention include those where —O—A< and Z respectively are:

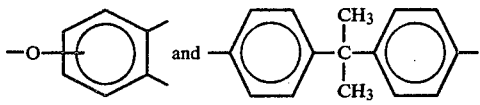

and R is selected from hexamethylene,

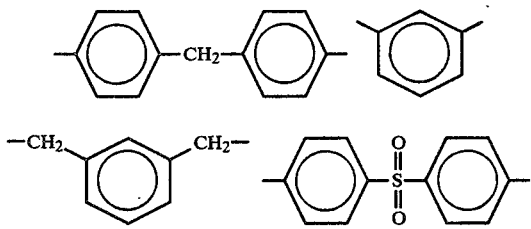

and polyetherimides containing two or more of the R groups.

Polyetherimides can be obtained by any of the methods well known to those skilled in the art including the reaction of any aromatic bis(ether anhydrides) of the formula

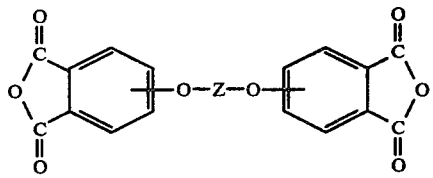

where Z is as defined hereinbefore with an organic diamine of the formula $$H_2N-R-NH_2$$

where R is as defined hereinbefore.

Aromatic bis(ether anhydride)s of the above formula include, for example, 2,2-bis[4-(2,3-dicarboxyphenoxy)-phenyl]-propane dianhydride; 4,4'-bis(2,3-dicarboxyphenoxy)diphenyl ether dianhydride; 1,3-bis(2,3-dicarboxyphenoxy)benzene dianhydride; 4,4'-bis(2,3-dicarboxyphenoxy)diphenyl sulfide dianhydride; 1,4-bis(2,3-dicarboxyphenoxy)benzene dianhydride; 4,4'-bis(2,3-dicarboxyphenoxy)diphenyl sulfone dianhydride; 2,2-bis[4-(3,4-dicarboxyphenoxy)phenyl]propane dianhydride; 4,4'-bis(3,4-dicarboxyphenoxy)diphenyl ether dianydride; 4,4'-bis(3,4-dicarboxyphenoxy)diphenyl sulfide dianhydride; 1,3-bis(3,4-dicarboxyphenoxy)benzene dianhydride; 1,4-bis(3,4-dicarboxyphenoxy)benzene dianhydride; 4,4'-bis(3,4-dicarboxyphenoxy)benzophenone dianhydride; 4-(2,3-dicarboxyphenoxy)-4-(3,4-dicarboxyphenoxy)diphenyl 2,2-propane dianhydride; etc., and mixtures of such dianhydrides.

In addition, aromatic bis(ether anhydride)s also included by the above formula are shown by Koton, M. M.; Florinski, F. S.; Bessonov, M. I.; Rudakov, A. P. (Institute of Heteroorganic compounds, Academy of Sciences, U.S.S.R.), U.S.S.R. Pat. No. 257,010, Nov. 11, 1969, Appl. May 3, 1967. In addition, dianhydrides are shown by M. M. Koton, F. S. Florinski, Zh Org. Khin, 4(5), 744 (1968).

Organic diamines of the above formula include, for example, m-phenylenediamine, p-phenylenediamine, 4,4'-diaminodiphenylpropane, 4,4'-diaminodiphenylmethane benzidine, 4,4'-diaminodiphenyl sulfide, 4,4'-diaminodiphenyl sulfone, 4,4'-diaminodiphenyl ether, 1,5-diaminonaphthalene, 3,3'-dimenthylbenzidine, 3,3'-dimethoxybenzidine, 2,4-bis(-amino-t-butyl)toluene, bis(p- -amino-t-butylphenyl)ether, bis(p- -methyl-o-aminopentyl)benzene, 1,3-diamino-4-isopropylbenzene, 1,2-bis(3-aminopropoxy)ethane, m-xylylenediamine, p-xylylenediamine, 2,4-diaminotoluene, 2,6-diaminotoluene, bis(4-aminocyclohexyl)methane, 3-methylheptamethylenediamine, 4,4-dimethylheptamethylenediamine, 2,11-dodecanediamine, 2,2-dimethylolpropylenediamine, octamethylenediamine, 3-methoxyhexamethylenediamine, 2,5-dimethylhexamethylenediamine, 2,5-dimethylheptamethylenediamine, 3-methylheptamethylenediamine, 5-methylnonamethylenediamine, 1,4-cyclohexanediamine, 1,12-octadecanediamine, bis(3-aminopropyl)sulfide, N-methyl-bis(3-aminopropyl)amine, hexamethylenediamine, heptamethylenediamine, nonamethylenediamine, decamethylenediamine, bis(3-aminopropyl)tetramethyldisiloxane, bis(4-aminobutyl)tetramethyldisiloxane, and the like.

The aromatic bis(ether anhydride) used in making the above-mentioned preferred polyetherimides is 2,2-bis[4-(3,4-dicarboxy phenoxy)phenyl]propane dianhydride (bisphenol A bisphthalic anhydride) and the diamines used are hexamethylene diamine, m-phenylene diamine, m-xylylene diamine, 4,4'-diaminodiphenylmethane and diamino diphenylsulfone.

In general, the reactions can be advantageously carried out employing well-known solvents, e.g., o-dichlorobenzene, m-cresol/toluene, N-methyl-pyrrolidone, etc., in which to effect interaction between the dianhydrides and the diamines, at temperatures of from about 100° to 250° C. Alternatively, the polyetherimides can be prepared by melt polymerization of any of the above dianhydrides with any of the above diamine compounds while heating the mixture of the ingredients at elevated temperatures with concurrent intermixing. Generally, melt polymerization temperatures between about 200° to 400° C. and preferably 230° to 300° C. Can be employed. The conditions of the reaction and the proportions of ingredients can be varied widely depending on the desired molecular weight, intrinsic viscosity, and solvent resistance. In general, equimolar amounts of diamine and dianhydride are employed for high molecular weight polyetherimides, however, in certain instances, a slight molar excess (about 1 to 5 mol percent) of diamine can be employed resulting in the production of polyetherimides having terminal amine groups. Monofunctional organic amines such as aniline, or organic anhydrides such as phthalic anhydride and maleic anhydride provide molecular weight control. Low molecular weight polyetherimide can be employed to form copolymers. From 0.1 to 50 mole percent of comonomers based on the total moles of reactants can be employed. Generally, useful polyetherimides have an intrinsic viscosity [$\eta$] greater than 0.2 deciliters per gram, preferably 0.35 to 0.60, or 0.7 deciliters per gram or even higher when measured in m-cresol at 25° C.

Included among the many methods of making the polyetherimides are those disclosed in U.S. Pat. Nos. Heath et al, 3,847,867, Williams 3,847,869, Takekoshi et al, 3,850,885, White 3,852,242 and 3,855,178, etc. These disclosures are incorporated herein in their entirety by reference for the purpose of teaching, by way of illustration, general and specific methods for preparing polyetherimides suitable for the blends of this invention.

In accordance with the present invention, blends of the polyetherimides are generally obtainable in all proportions of the polyetherimides relative to each other. Consequently, blends comprising from about 1 to about 99%, by weight of one polyetherimide and from about 99 to about 1%, by weight of another polyetherimide are included within the scope of the invention as well as blends of three or more different polyetherimides containing at least about 1% by weight of each of the contained polyetherimides. By controlling the proportions of the various polyetherimides relative to each other, blends having certain predetermined properties which are improved over those of one or more components of the blend alone may be readily obtained. In general, blends of polyetherimides have a good appearance and exhibit a high glass transition temperature such as from 125° to 210° C.

It is contemplated that the polyetherimide blends of the present invention may also include additive materials such as fillers, stabilizers, plasticizers, flexibilizers, surfactant agents, pigments, dyes, reinforcements, flame retardants and diluents in conventional amounts.

Methods for forming polyetherimide blends may vary considerably. Prior art blending techniques are generally satisfactory. A preferred method comprises blending the polymers and additives such as reinforcements in powder, granular or filamentous form, extruding the blend, and chopping the extrudate into pellets suitable for molding by means conventionally used to mold normally solid thermoplastic compositions.

The polyetherimide blends of the present invention have application in a wide variety of physical shapes and forms, including the use as films, molding compounds, coatings, etc. When used as films or when made into molded products, these blends, including laminated products prepared therefrom, not only possess good physical properties at room temperature but they retain their strength and excellent response to workloading at elevated temperatures for long periods of time. Films formed from the blends of this invention may be used in application where films have been used previously. Thus, the blends of the present invention can be used in automobile and aviation applications for decorative and protective purposes, and as high temperature electrical insulation for motor slot liners, transformers, dielectric capacitors, cable and coil wrappings (form wound coil insulation for motors), and for containers and containers linings. The blends can also be used in laminated structures where films or solutions of the blend are applied to various heat-resistant or other type of materials such as asbestos, mica, glass fiber and the like, the sheets superimposed one upon the other, and thereafter subjecting the sheets to elevated temperatures and pressures to effect flow and cure of the resinous binder to yield cohesive laminated structures. Films made from the subject polyetherimide blends can also serve in printed circuit applications.

Alternatively, solutions of the blends herein described can be coated on electrical conductors such as copper, aluminum, etc. and thereafter the coated conductor can be heated at elevated temperatures to remove the solvent and provide a continuous resinous composition thereon. If desired, an additional overcoat may be applied to such insulated conductors including the use of polymeric coatings, such as polyamides, polyesters, silicones, polyvinylformal resins, epoxy resins, polyimides, polytetrafluoroethylene, etc. The use of the blends of the present invention as overcoats on other types of insulation is not precluded.

Other applications which are contemplated for these blends include their use as binders for asbestos fibers, carbon fibers, and other fibrous materials in making brake linings. In addition, molding compositions and molded articles may be formed from the polymeric blends of the invention by incorporating such fillers as asbestos, glass fibers, talc, clay, quartz powder, finely divided carbon, and metals, silica and the like into the blends prior to molding. Shaped articles may be molded under heat, or under heat and pressure, in accordance with practices well-known in the art.

The following examples illustrate specific polyetherimide blends in accordance with the present invention. It should be understood that the examples are given for the purpose of illustration and do not limit the invention. In the examples, all parts and percentages are by weight unless otherwise specified.

EXAMPLE I

Binary polyetherimide blends according to the invention were prepared, formed into blend films and then tested for glass transition temperature.

A first polyetherimide was prepared from the reaction product of essentially equimolar amounts of 2,2-bis[4-(3,4-dicarboxy phenoxy)phenyl] propane dianhydride and m-phenylene diamine produced at elevated temperature of about 250° to about 300° C. and under nitrogen atmosphere. A test specimen in the form of a solution cast film was tested for glass transition temperature and the results are set forth in the following Table I.

A second polyetherimide was prepared from the reaction product of hexamethylenediamine and 2,2-bis[4-(3,4-dicarboxy phenoxy)phenyl] propane dianhydride and formed into a test specimen as above. The glass transition temperature of this polyetherimide is also set forth in Table I.

About 90 parts of the first polyetherimide in a N-methylpyrrolidone solution were mixed with about 10 parts of the second polyetherimide in a N-methylpyrrolidone solution and the polymer mixture was then solution cast to form a film. The glass transition temperature of the blend film was measured and is given in Table I.

The above blending procedure was then repeated so as to produce six additional blends having varying amounts of the first polyetherimide relative to the second polyetherimide. The glass transition temperature for each of the additional blends is also set forth in Table I. From the data, it can be observed that blends containing from 50 to 70% of the first polyetherimide and 50 to 30% of the second polyetherimide have a glass transition temperature in the range of 165° to 190° C. which makes these blends particularly adaptable for automotive and appliance applications.

TABLE I

| First Polyetherimide Content (%) | Second Polyetherimide content (%) | Glass Transition Temperature (°C.) |
| --- | --- | --- |
| 100 | 0 | 222 |
| 90 | 10 | 210 |
| 80 | 20 | 198 |
| 70 | 30 | 189 |
| 60 | 40 | 180 |
| 50 | 50 | 167 |

TABLE I-continued

| First Polyetherimide Content (%) | Second Polyetherimide content (%) | Glass Transition Temperature (°C.) |
|---|---|---|
| 30 | 70 | 138 |
| 10 | 90 | 128 |
| 0 | 100 | 121 |

EXAMPLE II

Binary polyetherimide blends according to the invention were prepared, formed into blend films and then tested for glass transition temperature.

A first polyetherimide was prepared from the reaction product of essentially equimolar amounts of 2,2-bis[4-(3,4-dicarboxy phenoxy)phenyl] propane dianhydride and m-phenylene diamine produced at elevated temperature of about 250° to about 300° C. and under nitrogen atmosphere. A test specimen solution coated in the form of a film was tested for glass transition temperature and the results are set forth in the following Table II.

A second polyetherimide was prepared from the reaction product of m-xylene diamine and 2,2-bis[4-(3,4-dicarboxy phenoxy)phenyl] propane dianhydride and formed into a test specimen as above. The glass transition temperature of this polyetherimide is also set forth in Table II.

About 90 parts of the first polyetherimide in a N-methylpyrrolidone solution were mixed with about 10 parts of the second polyetherimide in a N-methylpyrrolidone solution and the polymer mixture was then solution cast to form a film. The glass transition temperature of the blend was measured and is given in Table II.

The above blending procedure was then repeated so as to produce six additional blends having varying amounts of the first polyetherimide relative to the second polyetherimide. The glass transition temperature for each of the additional blends is also set forth in Table II. From the data, it can be observed that blends containing from 10 to 60% of the first polyetherimide and 90 to 40% of the second polyetherimide have a glass transition temperature in the range of 170° to 195° C. which also makes these blends particularly adaptable for automotive and appliance applications.

TABLE II

| First Polyetherimide Content (%) | Second Polyetherimide content (%) | Glass Transition Temperature (°C.) |
|---|---|---|
| 100 | 0 | 222 |
| 90 | 10 | 211 |
| 80 | 20 | 208 |
| 70 | 30 | 204 |
| 60 | 40 | 196 |
| 50 | 50 | 185 |
| 30 | 70 | 185 |
| 10 | 90 | 171 |

TABLE II-continued

| First Polyetherimide Content (%) | Second Polyetherimide content (%) | Glass Transition Temperature (°C.) |
|---|---|---|
| 0 | 100 | 168 |

EXAMPLE III

Polyetherimide blends according to the invention were prepared from a polyetherimide homopolymer and a polyetherimide copolymer. The blends were formed into blend films and then tested for glass transition temperature.

The polyetherimide homopolymer was prepared from the reaction product of essentially equimolar amounts of 2,2-bis[4-(3,4-dicarboxy phenoxy)phenyl] propane dianhydride and m-phenylene diamine produced at elevated temperature of about 250° to about 300° C. and under nitrogen atmosphere. A test specimen solution coated in the form of a film was tested for glass transition temperature and the results are set forth in Table III.

The polyetherimide copolymer was prepared from the reaction product of essentially equimolar amounts of 2,2-bis[4-(3,4-dicarboxy phenoxy) phenyl] propane dianhydride and a mixture of equimolar amounts of m-phenylene diamine and hexamethylene diamine. About 50 parts of the polyetherimide homopolymer were mixed in solution with about 50 parts of the polyetherimide copolymer and the polymer mixture was then solution cast to form a film. The glass transition temperature of the blend film was measured and is given in Table III.

Another polyetherimide copolymer was prepared as above except that the molar ratio of m-phenylene diamine to hexamethylene diamine was about three to one. About 75 parts of the polyetherimide homopolymer were mixed in solution with about 25 parts of the polyetherimide copolymer and the polymer mixture was then solution cast to form a blend film. The glass transition temperature of the blend was measured and is given in Table III.

A further polyetherimide copolymer was prepared as above with the exception that the molar ratio of m-phenylene diamine to hexamethylene diamine was about one to three. About 25 parts of the polyetherimide homopolymer were mixed in solution with about 75 parts of the second polyetherimide copolymer and the polymer mixture was then solution cast to form a blend film. The glass transition temperature of the blend was measured and is given in Table III.

From the data presented in Table III, it can be observed that the polyetherimide homopolymer-copolymer blends have exceptionally high glass transition temperatures even at high aliphatic amine concentrations, i.e., at high hexamethylene diamine ratios. These high glass transition temperatures give the blends utility as coatings and insulation and as compression and injection molding compounds.

TABLE III

| Polyetherimide Homopolymer Content (%) | Polyetherimide copolymer content (%) | Ratio of m-phenylene diamine to hexamethylene diamine to prepare copolymer | Glass Transition Temperature (°C.) |
|---|---|---|---|
| 100 | 0 | — | 223 |
| 75 | 25 | 3:1 | 211 |

TABLE III-continued

| Polyetherimide Homopolymer Content (%) | Polyetherimide copolymer content (%) | Ratio of m-phenylene diamine to hexamethylene diamine to prepare copolymer | Glass Transition Temperature (°C.) |
|---|---|---|---|
| 50 | 50 | 1:1 | 203 |
| 25 | 75 | 1:3 | 198 |

Substitution of other polyetherimides for the polyetherimides of the blends of the above examples may result in the formulation of polyetherimide polymer blends having similar characteristics.

While the present invention has been described with reference to particular embodiments thereof, it will be understood that numerous modifications may be made by those skilled in the art without actually departing from the spirit and scope of the invention as defined in the appended claims.

We claim:

1. A composition comprising:
a blend of two or more polyetherimides selected from the class consisting of

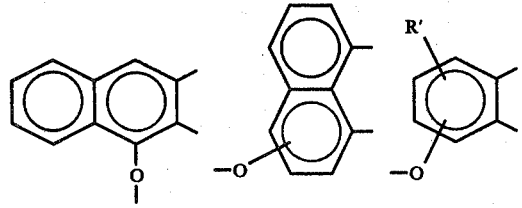

where a represents a whole number in excess of 1, the group —O—A is selected from:

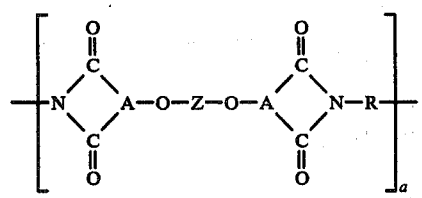

R' being hydrogen, lower alkyl or lower alkoxy, Z is a member of the class consisting of (1)

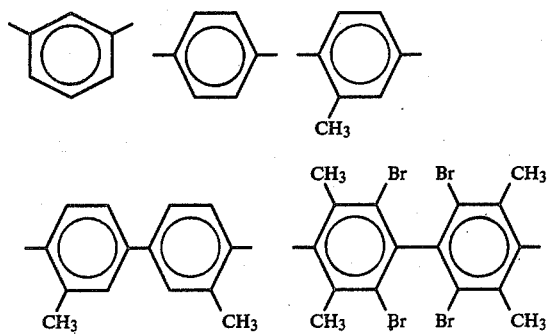

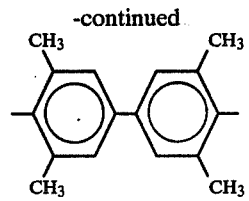

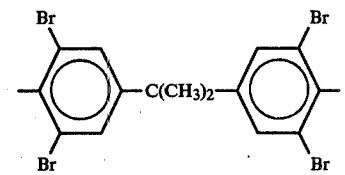

and (2) divalent organic radicals of the general formula:

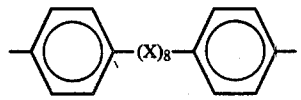

where X is a member selected from the class consisting of divalent radicals of the formulas,

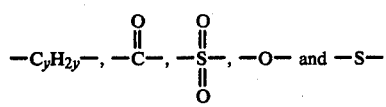

where q is 0 or 1, y is a whole number from 1 to 5, and R is a divalent organic radical selected from the class consisting of (1) aromatic hydrocarbon radicals having from 6–10 carbon atoms and halogenated derivatives thereof, (2) alkylene radicals and cycloalkylene radicals having from 2–20 carbon atoms, and C (2–8) alkylene terminated polydiorganisiloxane, and (3) divalent radicals included by the formula:

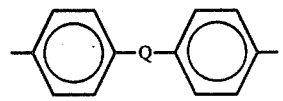

where Q is a member selected from the class consisting of

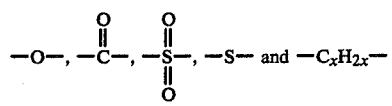

where x is a whole number from 1 to 5 inclusive; wherein the glass transition temperatures of the component polyetherimides are different and the glass transition temperature of the blend lies between those of the component polyetherimides.

2. A composition, comprising: a blend of two or more polyetherimides selected from the class consisting of:

$$\left[ \begin{array}{c} \text{structure with two phthalimide groups connected via } -O-Z-O- \text{ and N-R} \end{array} \right]_a$$

where Z is $$-\phi-C(CH_3)_2-\phi-$$

and R is selected from hexamethylene, $$-\phi-CH_2-\phi-, \quad -H_2C-\phi-CH_2-,$$

$$-\phi-SO_2-\phi-, \text{ and } -\phi-;$$

wherein the glass transition temperatures of the component polyetherimides are different and the glass transition temperature of the blend lies between those of the component polyetherimides.

3. A composition in accordance with claim 2 containing a first polyetherimide where R is $$-\phi-$$

4. A composition in accordance with claim 3 containing a second polyetherimide where R is hexamethylene.

5. A composition in accordance with claim 3 containing a second polyetherimide where R is $$-CH_2-\phi-CH_2-$$

6. A composition in accordance with claim 1 comprising a first and second polyetherimides each formed by the reaction of aromatic bis(ether anhydrides) of the formula $$\text{anhydride}-O-Z-O-\text{anhydride}$$

with one or more organic diamines of the formula $$H_2N-R-NH_2$$

7. A composition in accordance with claim 6 wherein the bis ether anhydride of the first and second polyetherimide is of the formula $$\text{anhydride}-O-\phi-C(CH_3)_2-\phi-O-\text{anhydride}$$

the diamine of the first polyetherimide is $$H_2N-\phi-NH_2$$

and the diamine of the second polyetherimide is selected from one or more of hexamethylene diamine, $$H_2N-\phi-CH_2-\phi-NH_2$$

$$H_2N-H_2C-\phi-CH_2-NH_2$$

$$H_2N-\phi-SO_2-\phi-NH_2$$

8. A composition in accordance with claim 7 where the diamine for the second polyetherimide is hexamethylene diamine and $$H_2N-H_2C-\phi-CH_2-NH_2$$

9. A composition in accordance with claim 2 containing one or more fillers.

* * * * *